May 28, 1946.   J. D. CUMMINGS   2,401,052
INTERNAL JIG SUPPORT FOR BENDING LARGE DIAMETER PIPE
Filed Feb. 10, 1944   2 Sheets-Sheet 1

INVENTOR.
JAMES D. CUMMINGS.
Lester B. Clark.
ATTORNEY.

May 28, 1946.  J. D. CUMMINGS  2,401,052
INTERNAL JIG SUPPORT FOR BENDING LARGE DIAMETER PIPE
Filed Feb. 10, 1944  2 Sheets-Sheet 2

INVENTOR.
JAMES D. CUMMINGS.
BY
Lester B. Clark.
ATTORNEY.

Patented May 28, 1946

2,401,052

UNITED STATES PATENT OFFICE 2,401,052

INTERNAL JIG SUPPORT FOR BENDING LARGE DIAMETER PIPE

James D. Cummings, Houston, Tex., assignor to Crutcher-Rolfs-Cummings Company, Houston, Tex., a corporation of Texas Application February 10, 1944, Serial No. 521,772

8 Claims. (Cl. 153—63)

The invention relates to an internal jig support for use in bending large diameter pipe and particularly thin walled pipe so as to prevent collapse or undue distortion of the pipe during the bending operation.

The invention relates generally to my prior copending application Serial No. 501,068, filed September 3, 1943, for Portable machine for bending large diameter pipe, which has matured into Patent No. 2,347,593, issued April 25, 1944, wherein the combination of the bending machine and one form of an internal jig support is shown, and also to my copending application Serial No. 519,362, filed January 22, 1944, for Method and apparatus for cold bending of large diameter thin walled pipe, which is an improvement in the pipe bending machine as particularly applied to thin walled large diameter pipe.

It is often desirable to bend a large diameter thin walled section of pipe without transporting or heating the pipe, but to effect a cold bending of the pipe by properly supporting the thin wall of the pipe both internally and externally in a suitable manner so as to obtain the desired bend or configuration.

One of the important problems in the cold bending of large diameter thin walled pipe is the proper support of the inside of the pipe so as to maintain its round configuration and to permit bending and possibly the wrinkling of the pipe wall on the inside of the bend during the operation. To accomplish this the present type of internal jig support has been devised wherein practically the entire inner surface of the pipe is adequately supported by the jig so as to absorb the stresses occurring during the bending operation.

It is therefore one of the objects of the present invention to provide an internal jig support for large diameter pipe which is expansible and collapsible by adjustment thereof in order to position and remove the jig relative to the pipe.

Another object of the invention is to provide a pair of oppositely arranged pipe contacting members in combination with a beam for effecting the expansion and contraction thereof so as to provide an internal support for a section of pipe.

Another object of the invention is to provide an internal pipe jig which may be set to securely support the inside of the pipe while permitting bending of the pipe.

Another object of the invention is to provide an internal jig support for large diameter pipe wherein the jig is constructed to flex during the operation of bending the pipe.

Another object of the invention is to provide a pipe jig made up of a plurality of shoes, segments and beam sections which are interconnected to permit flexing thereof.

Another object of the invention is to provide an internal pipe jig arranged to initially support the pipe at predetermined points to effect a wrinkling of the pipe on the inside of the bend.

Other and further objects of the invention will be readily apparent when the following description is considered in connection with the accompanying drawings wherein:

Fig. 4 is a side elevation of a shoe having a starter rib thereon.

Fig. 1 illustrates a large diameter thin walled pipe 2 and for purposes of illustration, but not limitation, it may be a section of pipe approximating sixteen to thirty inches in diameter and having a wall thickness of about one-quarter inch.

Such pipe is usually made up in lengths of about thirty feet and is installed in pipe lines and the like by butt welding the ends of the adjacent pipe sections.

Naturally in the constructing of such pipe lines it is necessary that the pipe be bent or curved to follow various contours of the earth's surface and in avoiding obstructions and in water crossings. It would require considerable advance engineering to determine the exact angle of bend to be applied for any particular location and very often the straight sections of pipe are laid in place and then a curved section fitted in to connect the two straight sections. The length and angle of curve of this section is determined at the time it is to be laid. In the practice prior to this and my copending inventions mentioned above, it was necessary to take such a section of pipe to a location where it could be heated and bent and sometimes heat treated and then transported back to location hoping that it would fit. The present practice is to bend the pipe at the location in accordance with my inventions in an amount necessary to fit it into the pipe line. The equipment permits the cold bending of the pipe while maintaining its contour and configuration and not only simplifies the procedure, but results in a very substantial saving in time, labor and money.

Figure 3:
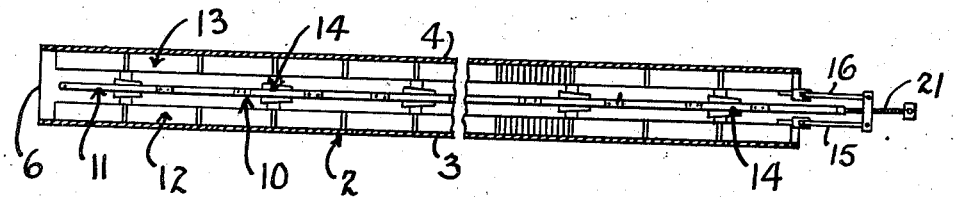
Fig. 3 is a diagrammatic view showing the jig arranged in a section of pipe.

Fig. 3 shows the pipe 2 as having a length say of thirty feet which is to be bent somewhere during its length, possibly in the middle or possibly close to one end and it seems obvious that the whole pipe must be supported because of the fact that one end is clamped in the pipe bending machine and a pull exerted adjacent the other end with the pipe supported externally in a suitable bending section so as to effect the desired curvature or bend.

It seems obvious that under circumstances such as this and referring to Fig. 3, that if the surface 3 were the inside of the bend and the surface 4 were the outside of the bend that then the metal of the surface 3 would be placed in compression while that of the surface 4 would be placed in tension during the bending operation. The top surface of the pipe 5 and the lower surface of the pipe 6 would not be subjected to a great deal of bending stress because it lies on the center line along which the curvature would occur. There would be little or no tendency for the surfaces 5 and 6 to collapse. There would be considerable tendency for the surface 4 to collapse or move inwardly to change the circular form of the pipe while the surface 3 would tend to buckle or wrinkle. Therefore in order to support the pipe internally and maintain it as nearly as possible in its original circular configuration the pipe jig 10 has been devised.

This pipe jig generally constitutes a longitudinal beam 11 and the opposite pipe engaging members 12 and 13. The wedge assemblies 14 connect the beam and the pipe engaging members at spaced intervals so that longitudinal movement of the beam either extends or retracts the pipe engaging members 12 and 13 so as to permit the insertion and removal of the jig and supporting of the pipe.

In order to operate the jig the actuating device 15 is arranged at one end in the form of a yoke 16 connected at 17 and 18 to the pipe engaging members 12 and 13 respectively. This yoke has a cross bar 19 which carries a threaded nut 20 through which the push-pull spindle 21 is arranged. This spindle carries a bushing 22 which is fitted into a collar 23 affixed to the end section of the beam 11 so that upon turning of the spindle the beam will be pushed or pulled relative to the pipe engaging members 12 and 13 so as to actuate the wedge assembly 14 in extending or retracting the pipe engaging members.

It seems obvious that the pipe engaging members may be retracted and the jig inserted into the pipe 2 as seen in Fig. 3. Turning of the spindle then actuates the wedge assemblies, causes extension of the pipe engaging members so that they fit firmly against the inside of the pipe so that it is ready to be inserted in the bending machine and sufficient force applied thereto to effect the bending. The bending machines to be used are shown in my prior copending applications.

Each of the pipe engaging members is made up of a plurality of segments 30 which are joined together by a connecting plate 31 which may be of a suitable metal material to permit a limited amount of flexing thereof so that adjacent sections may bend slightly relative to each other to follow the pipe during the bending operation.

Each of the sections is made up of a stud 32 which is in the form of a wooden member, say two inches by six inches, and having a length of approximately two feet. This wooden stud is connected by the screws or bolts 33 to the coupling plates 31.

Each of these studs 32 is arranged to carry a plurality of pipe contacting shoes 35 which have the curved outer periphery 36 to engage the inside surface 37 of the pipe section of the pipe 2. These shoes are portions of the chord of the circle which constitutes the inside of the pipe and each shoe has a cut-away portion 39 in which the stud 32 is received. In this manner the shoes are held in the same relative radial position upon the stud and are retained in spaced position by suitable washers 40 which are mounted between adjacent shoes 35 on the flexible cables 41, two of which extend longitudinally through the shoes of all of the segments.

It seems obvious that with this arrangement each shoe will be free to move slightly relative to the stud 32 and the cable 41, but will be held in alignment so that a flexible chain construction could be said to be provided.

In order to further retain the opposite pipe engaging members in alignment a guide rod 43 is affixed to the pipe engaging member 12 and a guide sleeve 44 affixed to the pipe engaging member 13. This rod and guide are interfitting at 45 as seen in Fig. 2 and may be limited as to their sliding movement by the bolt and slot connection 46.

In this manner the pipe engaging members 12 and 13, while being say 30 feet or more in length depending upon the number of segments 30 which are connected together, will be quite flexible so that the pipe section can be bent at the desired angle or curvature without damage or injury to the internal support jig.

Figure 1:
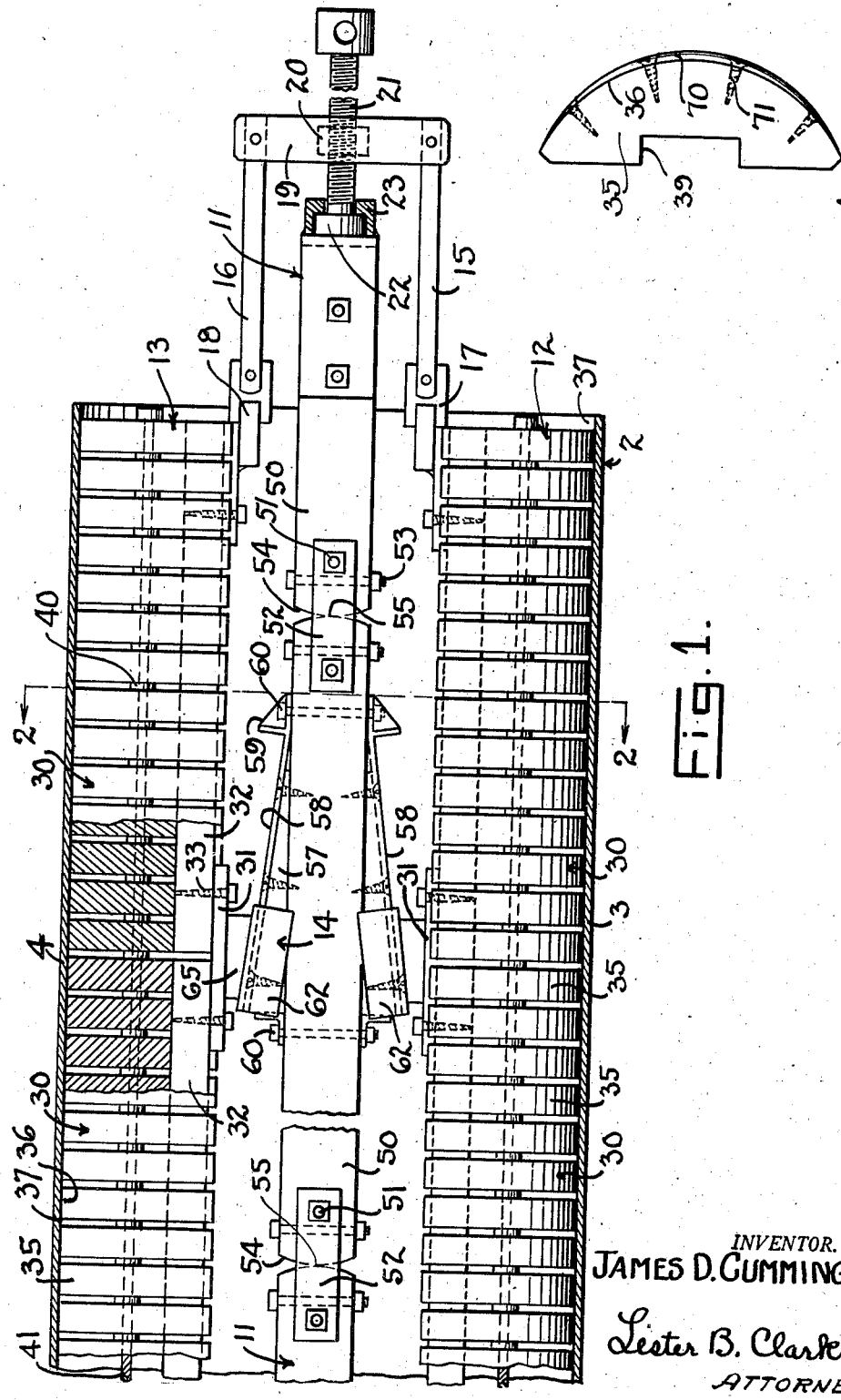
Fig. 1 is a top plan view looking down on the pipe jig in expanded position inside of the pipe.
Figure 2:
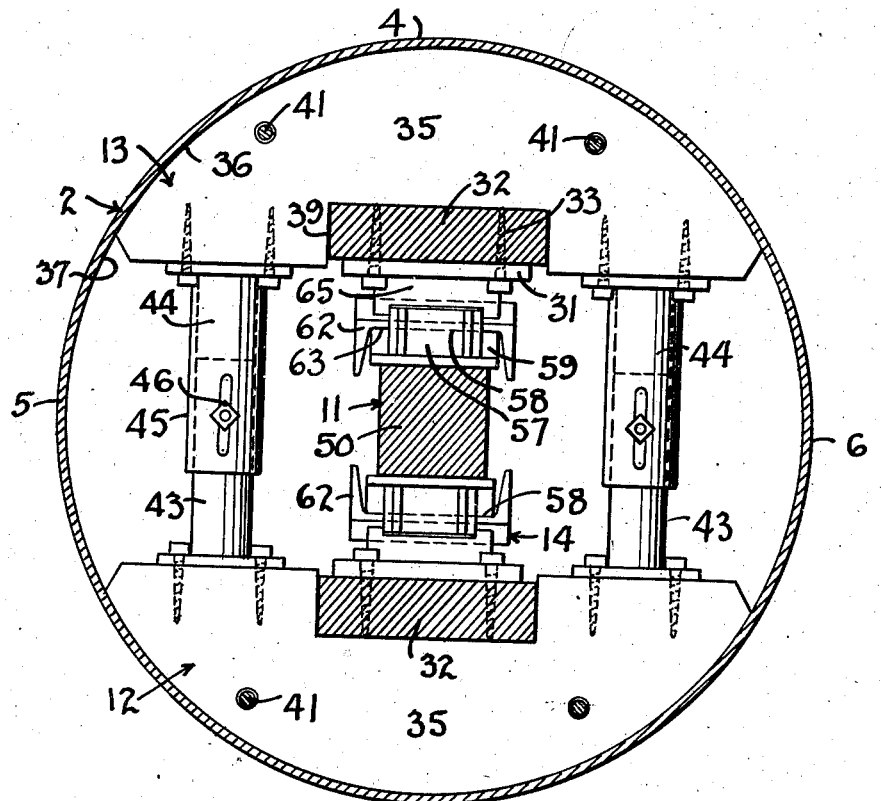
Fig. 2 is a section taken on the line 2—2 of Fig. 1 and illustrating the arrangement of the parts.

The beam 11 is best seen in top elevation in Fig. 1 and in transverse section in Fig. 2 and constitutes a plurality of lengths 50 of wooden material of say four inches by four inches. Each of these sections carries a coupling bolt 51 to pass through the coupling plates 52 so that the plates may have longitudinal pivotal movement even though they abut end to end as at 55 and have their ends curved at 54 to permit such pivotal movement. Transverse bolts 53 may be arranged to reenforce the lengths at the ends.

Each one of the lengths 50 may or may not have a wedge assembly 14 arranged thereon depending on how frequently it is desired to apply the force in extending the pipe engaging members.

Each wedge assembly 14 comprises a wooden piece 57 which has an inclined wedge surface 58 which may be a forging or metal casting having a stop lug 59 thereon and which may be affixed to the beam lengths by the bolts 60. Arranged to cooperate with this inclined wedge 58 is a channel 62 having a surface 63 to ride on the inclined surface 58. This channel is in turn supported by the wedge 65 which may be formed integral with the plate 51. This wedge 65 maintains the channel 62 and the surface 63 at the same inclination as the wedge face 58. With this arrangement, it seems obvious that when the beam 11 is moved to the right as seen in Fig. 1 the plates 31 will be forced radially outward from each side of the beam causing the pipe contacting members 12 and 13 to move radially outward and engage the inside surface 37 of the pipe 2. On the other hand when the beam 11 is moved to the left by pushing on the spindle 21 the wedge surface 58 will move from beneath the surface 63 and allow the pipe engaging members to retract from the surface 37 of the pipe.

It seems obvious that any desired number of the segments 30 may be connected end to end in order to make up a pipe jig of the desired length depending upon the pipe or portion of the pipe which is to bend.

A pipe jig can be adapted for various sizes of pipe by merely changing the shoes 35 thereon so that they will have a configuration as to their surface 36 which will fit the surface 37 on the inside of the pipe.

In some types and sizes of pipe it may be desirable to predetermine the position and shape of the wrinkle to be provided on the inside of the bend of the pipe and the construction of the jig may be altered to accomplish this either by itself or in combination with the bending section shown in my application Serial No. 519,362. Fig. 4 shows one of the shoes 35 of the jig which has had a rib 70 affixed by screws 71 to the peripheral portion or surface 36. This rib is preferably a half round strip bent to fit the shoe and gradually tapering from its center toward its ends. The depth at the center would approximate the depth of the wrinkle to be provided. A shoe thus equipped could be arranged in the jig at the desired positions where it had been determined that a wrinkle should be formed. When the jig is extended the rib will first contact the pipe and a more rigid support provided at the rib tending to force the pipe outwardly. Such ribbed shoe could be placed at the wedge section to insure a direct thrust against the pipe. Of course, such ribbed shoe would be placed only on the inside of the bend.

Broadly the invention contemplates a relatively flexible internal pipe jig to support large diameter thin walled pipe during a bending operation.

What is claimed is:

1. A collapsible pipe jig for expansion inside of a large diameter thin walled pipe so as to support the pipe for cold bending comprising a beam, said beam comprising a plurality of sections pivotally connected end to end, two opposite sets of pipe engaging shoes, each set comprising a plurality of sections, each section including a stud having a plurality of said shoes thereon, flexible means extending through each set of shoes to allow limited relative movement thereof, a plate connecting ends of said studs of adjacent sections, and means to extend and retract said sets of shoes including said beam and a plurality of inclined wedges engaging said stud connecting plates whereby axial movement of said beam extends or retracts said wedges.

2. A pipe supporting jig to be expanded within a pipe comprising a beam, wedge members thereon, a set of pipe engaging shoes disposed on opposite sides of said beam, means on each set of shoes to engage said wedge members, and means engaging the ends of said sets of shoes and said beam to effect relative movement of said beam and shoes to wedge said shoes in the pipe.

3. A pipe supporting jig to be expanded within a pipe comprising a beam, wedge members thereon, a set of pipe engaging shoes disposed on opposite sides of said beam, means on each set of shoes to engage said wedge members, and means engaging the ends of said sets of shoes and said beam to effect relative movement of said beam and shoes to wedge said shoes in the pipe, said beam and shoes having flexible connections therein to permit support of the pipe during cold bending thereof.

4. An internal jig for pipe bending comprising a plurality of pipe contact members, each member including a plurality of shoes, means mounting said shoes so that said members may flex with the pipe during bending, additional means to expand said members to engage the pipe including a longitudinal beam and wedges thereon to engage said members, and still additional means to engage said beam and said contact members to effect relative movement in actuating said wedges.

5. In an internal jig for cold bending of thin walled large diameter pipe comprising a plurality of oppositely arranged pipe engaging members to engage in inner periphery of the pipe, flexible means supporting said members, a flexible beam disposed between said members, cooperative wedge means between said beam and said flexible means, and means to effect relative movement of said beam and flexible means to effect the extending and retracting of said members.

6. In an internal jig for cold bending of thin walled large diameter pipe comprising a plurality of oppositely arranged pipe engaging members to engage in inner periphery of the pipe, flexible means supporting said members, a flexible beam disposed between said members, cooperative wedge means between said beam and said flexible means, and means to effect relative movement of said beam and flexible means to effect the extending and retracting of said members, said members each comprising a plurality of contact shoes arranged in sections, and means flexibly connecting the sections.

7. In an internal jig for cold bending of thin walled large diameter pipe comprising a plurality of oppositely arranged pipe engaging members to engage in inner periphery of the pipe, flexible means supporting said members, a flexible beam disposed between said members, cooperative wedge means between said beam and said flexible means, and means to effect relative movement of said beam and flexible means to effect the extending and retracting of said members, said beam including a plurality of pivotally connected lengths.

8. In an internal jig for cold bending of thin walled large diameter pipe comprising a plurality of oppositely arranged pipe engaging members to engage in inner periphery of the pipe, flexible means supporting said members, a flexible beam disposed between said members, cooperative wedge means between said beam and said flexible means, means to effect relative movement of said beam and flexible means to effect the extending and retracting of said members, and guide means connecting said pipe engaging members.

JAMES D. CUMMINGS.